United States Patent [19]

Kubota et al.

[11] Patent Number: 4,893,502

[45] Date of Patent: Jan. 16, 1990

[54] ANGLE SENSOR FOR THROTTLE VALVE OF INTERNAL COMBUSTION ENGINE

[75] Inventors: Masanori Kubota, Nakaminato; Sadayasu Ueno; Kanemasa Sato, both of Katsuta; Kiyoshi Miura, Ibaraki, all of Japan

[73] Assignees: Hitachi, Ltd., Tokyo; Hitachi Automotive Engineering Co., Ltd., Katsuda, both of Japan

[21] Appl. No.: 227,647

[22] Filed: Aug. 3, 1988

[30] Foreign Application Priority Data

Aug. 3, 1987 [JP] Japan .................................. 62-192649
Mar. 30, 1988 [JP] Japan .................................. 63-74338

[51] Int. Cl.⁴ .......................................... G01M 15/00
[52] U.S. Cl. ............................................... 73/118.1
[58] Field of Search ................. 73/116, 118.1, DIG. 3

[56] References Cited

U.S. PATENT DOCUMENTS

| 3,112,464 | 11/1963 | Ratajski et al. | 73/DIG. 3 |
| 3,988,710 | 10/1976 | Sidor et al. | 338/32 R |
| 4,392,375 | 7/1983 | Eguchi et al. | 73/118.1 |

FOREIGN PATENT DOCUMENTS

| 53938 | 6/1982 | European Pat. Off. . |
| 3227245 | 1/1984 | Fed. Rep. of Germany . |
| 107119 | 8/1981 | Japan . |
| 211603 | 3/1982 | Japan . |
| 40931 | 6/1982 | Japan . |
| 140103 | 7/1985 | Japan . |
| 1416925 | 12/1975 | United Kingdom . |

Primary Examiner—Jerry W. Myracle
Attorney, Agent, or Firm—Antonelli, Terry & Wands

[57] ABSTRACT

Disclosed is a non-contact type throttle angle sensor sensing and converting angular rotation of a throttle valve of an internal combustion engine into an electrical signal. The sensor comprises a magnetic field generating element disposed on one end of a rotatable throttle shaft, a magneto-sensitive element disposed opposite to the field generating element at a position fixed relative to a throttle body and spaced apart from the field generating element, the magneto-sensitive element generating an output whose level changes with the rotation of the throttle valve shaft relative to the throttle body, a housing forming an integral part of the throttle body to accommodate the field generating element and the magneto-sensitive element, and an electrical circuit converting the output of the magneto-sensitive element into an electrical signal, the electrical circuit including a circuit adjusting the zero level and maximum level of the output of the magneto-sensitive element.

20 Claims, 14 Drawing Sheets

F I G. 12
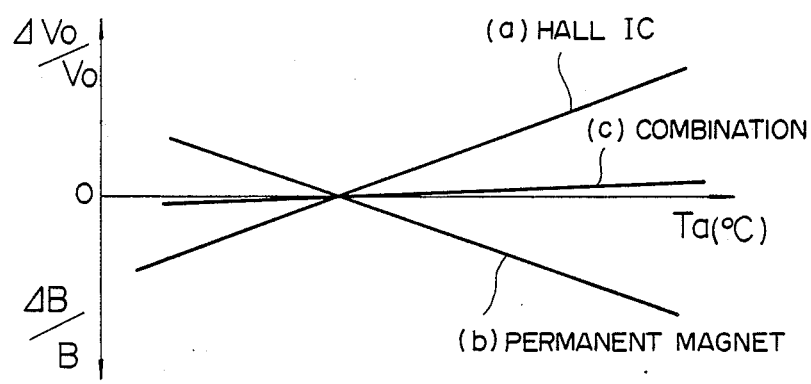

F I G. 16
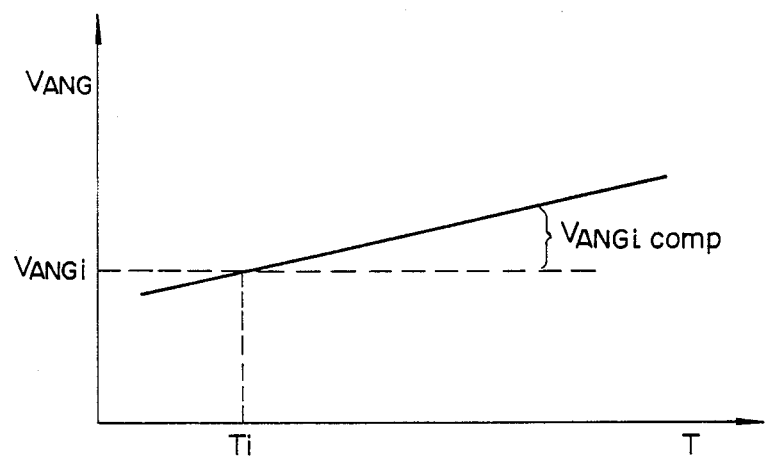

ANGLE SENSOR FOR THROTTLE VALVE OF INTERNAL COMBUSTION ENGINE

BACKGROUND OF THE INVENTION

This invention relates to a throttle angle sensor sensing a rotation angle of a throttle valve of an internal combustion engine in the form of an electrical signal.

JP-Y2-61-40931, which was filed as a Japanese utility model application on Dec. 12, 1980 and laid open on Nov. 21, 1986, discloses a throttle angle sensor which includes a potentiometer mounted at one end of the shaft of a throttle valve. In the disclosed throttle angle sensor, a slide terminal or contact slides in response to the rotation of the throttle valve thereby changing the resistance value of the potentiometer. Therefore, unless the throttle valve shaft and the potentiometer are assembled with high accuracy, the throttle angle sensor will be subjected to mechanical damage. Further, the throttle angle sensor has the problem of wear and mal-contact at the slide contact.

A non-contact type throttle angle sensor which solves the problem of the contact type throttle angle sensor described above is disclosed in, for example, JP-A-56-107119 which was filed as a Japanese patent application on Jan. 30, 1980 and laid open on Aug. 25, 1981. Non-contact type throttle angle sensors using a Hall effect element for angle detection ar also disclosed in, for example, JP-A-58-211603 which was filed as a Japanese patent application on June 3, 1982 and laid open on Dec. 9, 1983 and in JP-A-60-140103 which was filed as a Japanese patent application on Dec. 28, 1983 and laid open on Jul. 25, 1985.

In the prior art throttle angle sensors of both the contact type and the non-contact type, high accuracy which minimizes a change in the output relative to a change in the rotation angle of the throttle valve is required together with requirement for minimum adjustment of the input-output characteristic during the manufacturing process and smallest possible man-hours required for the manufacture.

SUMMARY OF THE INVENTION

It is an object of the present invention to provide a non-contact type throttle angle sensor which can operate without the problem of wear and mal-contact, in which the adjustment of the input-output characteristic can be easily attained with high accuracy and which requires small man-hours for the manufacture.

In accordance with one aspect of the present invention which attains the above object, there is provided an angle sensor for a throttle valve of an internal combustion engine, comprising a permanent magnet disposed on one end of the shaft of the throttle valve so as to generate a parallel magnetic flux and so that the direction of the magnetic flux rotates with the rotation of the throttle valve shaft, a throttle body accommodating the throttle valve, a cavity formed as an integral part of the throttle body to freely rotatably accommodate the permanent magnet, a magneto-sensitive element disposed in the cavity in a relation substantially parallel to the magnetic-flux appearing surface of the permanent magnet and spaced apart from the permanent magnet so as to detect a change in the magnetic flux density as a result of rotation of the permanent magnet, and an electrical circuit receiving and amplifying the output of the magneto-sensitive element so as to convert the detected change in the magnetic flux density into a corresponding change in an electrical signal.

In accordance with another aspect of the present invention which attains the above object, there is provided an angle sensor for a throttle valve of an internal combustion engine, comprising a permanent magnet disposed on one end of the shaft of the throttle valve so as to generate a magnetic field and so that its position changes with the rotation of the throttle valve shaft, a throttle body accommodating the throttle valve, a cavity formed as an integral part of the throttle body to freely rotatably accommodate the permanent magnet and communicating with a bore through which the throttle valve shaft extends, a magneto-sensitive element disposed in the cavity in a relation intersecting the magnetic field of the permanent magnet and spaced apart from the permanent magnet so as to detect a change in the magnetic field intensity as a result of the rotation of the permanent magnet, and an electrical circuit receiving and amplifying the output of the magneto-sensitive element so as to convert the detected change in the magnetic field intensity into a corresponding change in an electrical signal.

The throttle angle sensor having the structure described above does not include a slide contact and is freed from the prior art problem of mal-contact and contact wear. Also, because the magneto-sensitive element and the permanent magnet are accommodated in the cavity formed as the part of the throttle body, a separate accommodation casing is unnecessary thereby simplifying the structure and decreasing the man-hours required for assembling. Also, because the input-output characteristic of the sensor is electrically adjusted, the characteristic can be easily adjusted with high accuracy. Further, the provision of the electrical circuit part facilitates temperature compensation of the output of the magneto-sensitive element.

BRIEF DESCRIPTION OF THE DRAWINGS

FIG. 12 shows temperature characteristics of a Hall IC, a permanent magnet and their combination.

FIG. 16 is a graph illustrating the temperature compensation component.

DESCRIPTION OF THE PREFERRED EMBODIMENTS

Figure 1:
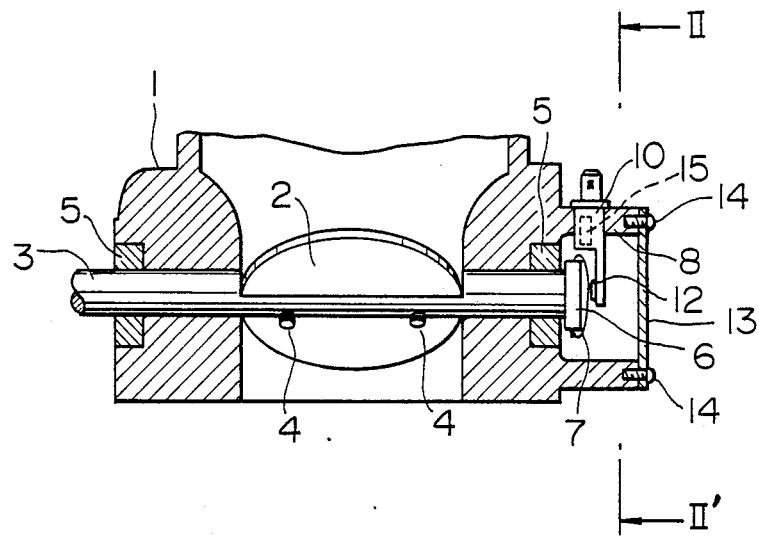
FIG. 1 is a schematic sectional view of a first embodiment of the throttle angle sensor according to the present invention.

FIG. 1 is a schematic sectional view showing the structure of a first embodiment of the throttle angle sensor according to the present invention.

Figure 2:
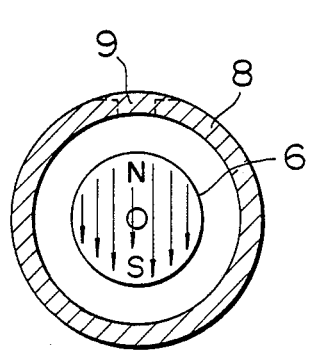
FIGS. 2 and 3 are sectional views taken along the line II—II in FIG. 1.

Referring to FIG. 1, a shaft 3 of a throttle valve 2 in an internal combustion engine is rotatably supported in a throttle body 1 through bearings 5. The throttle valve 2 is fixed to the throttle valve shaft 3 by set screws 4. A permanent magnet 6 is mounted on one end of the throttle valve shaft 3. As shown in FIG. 2 which is a sectional view taken along the line II—II' in FIG. 1 and in which the throttle body 1 and the permanent magnet 6 only are shown, a parallel magnetic field 7 is produced between the N and S poles of the permanent magnet 6. The throttle body 1 is provided with a housing 8 in which the permanent magnet 6 and a magneto-sensitive element 12 are accommodated. This housing 8 is preferably formed integrally with the throttle body 1 by die casting. A bore extends through the side walls of the throttle body 1 to permit communication between the internal cavity of the housing 8 and the throttle chamber, and the throttle valve shaft 3 is inserted into this bore.

Figure 3:
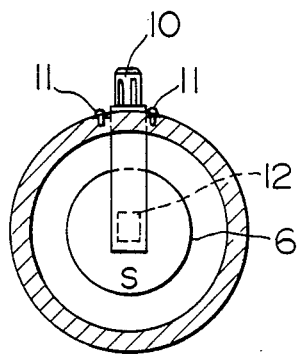

A hole 9 penetrates the upper wall of the housing 8, and an electrical connector 10 is mounted in this hole 9. FIG. 3 is a view similar to FIG. 2 to show that the electrical connector 10 is fixed in the hole 9 by set screws 11. At the end remote from the end having the permanent magnet 6, the throttle valve shaft 3 is coupled to a mechanical throttle actuator such as a throttle wire or a link or an electro-mechanical actuator (not shown). The magneto-sensitive element 12 is secured to the electrical connector 10 by, for example, an adhesive and is disposed opposite to and slightly spaced apart from the permanent magnet 6. The spacing between the magnet-sensitive element 12 and the permanent magnet 6 is selected to be sufficiently small so as to permit detection of a change in the direction of the magnetic field but not to be excessively small so as to prevent mechanical contact therebetween due to vibrations. When a magneto-resistive element is selected as the magneto-sensitive element 12, the spacing between the magneto-resistive element and the permanent magnet 6 is selected to be as small as possible so that the magnetoresistive element is sufficiently magnetically saturated by the magnetic field of the permanent magnet 6.

The magneto-sensitive element 12 employed in the illustrated embodiment is a magnetoresistive element having a planar surface pattern so that its resistance value changes depending on the direction of the applied magnetic field. Also, the permanent magnet 6 and the magneto-sensitive element 12 are disposed opposite to each other in such a relation that the surface of the magneto-sensitive element 12 having the planar surface pattern is substantially parallel to the parallel magnetic field 7 produced by the permanent magnet 6. Therefore, when the shaft 3 of the throttle valve 2 rotates to rotate the permanent magnet 6, the direction of the parallel magnetic field 7 applied to the magneto-sensitive element 12 changes. The opening of the housing 8 is closed by a cover 13 so as to prevent intrusion of magnetic powder, dust or the like from the outside. The cover 13 is fixed to the housing 8 by set screws 14.

The magneto-sensitive element 12 is preferably a magnetoresistive element of a ferromagnetic material so that its resistance value changes anisotropically depending on the angle between the direction of the applied magnetic field and the direction of current flowing through the element 12. In the illustrated embodiment, a thin film of a ferromagnetic alloy such as a Ni-Co alloy or a Ni-Fe alloy (permalloy) is deposited in a predetermined pattern by evaporation on a substrate to form two elements on the substrate, and these two elements are connected to provide a three-terminal structure, so that a differential output of the two elements can be obtained. As such a magneto-sensitive element 12, for example, an element made and sold by Sony Corporation under the trade name of SDME is available.

Figure 4:
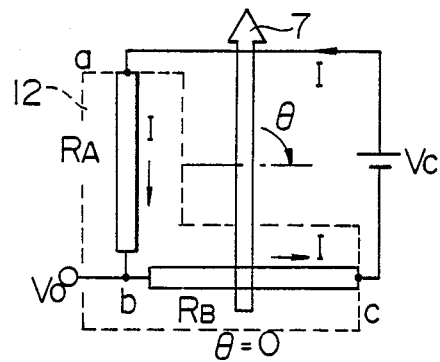
FIG. 4 shows schematically the structure of the magneto-sensitive element shown in FIG. 1.
Figure 5:
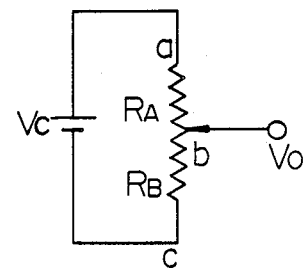
FIG. 5 is an equivalent circuit diagram of FIG. 4.
Figure 6:
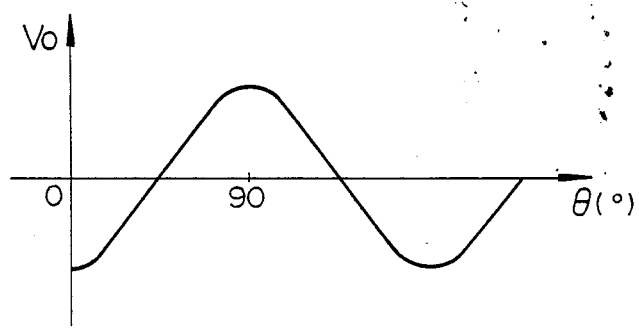
FIG. 6 is a graph showing how the output characteristic of the magneto-sensitive element changes relative to the direction of the magnetic field of the permanent magnet shown in FIG. 1.

FIG. 4 shows schematically the structure of the magneto-sensitive element 12, FIG. 5 is an equivalent circuit diagram of FIG. 4, and FIG. 6 shows the waveform of the output of the magneto-sensitive element 12. As shown in FIG. 4, a first magneto-sensitive element $R_A$ and a second magneto-sensitive element $R_B$ disposed perpendicular with respect to each other are connected in series at a middle point b, and a power supply voltage Vc is applied to power supply terminals (a power supply terminal and an earth terminal) a and c of the first and second magneto-sensitive elements $R_A$ and $R_B$ respectively. Thus, the magneto-sensitive element 12 is a three-terminal element having the terminals a, b and c. When the magnetic field 7 of the permanent magnet 6 is applied to the first and second magneto-sensitive elements $R_A$ and $R_B$, voltage Vo given by the following equation (1) appears at the point b:

$$Vo = \frac{R_B}{R_A + R_B} \cdot Vc \quad (1)$$

In the equation (1), $$R_A = Rx \sin^2\theta + Ry \cos^2\theta \quad (2)$$

$$R_B = Rx \cos^2\theta + Ry \sin^2\theta \quad (3)$$

where $\theta$ represents the angle between the direction of current I in each magneto-sensitive element and the direction of the magnetic field 7, Rx represents the resistance of each element when the direction of current flow is perpendicular to the direction of the magnetic field 7, and Ry represents the resistance of each element when the direction of current flow is parallel to the direction of the magnetic field 7.

When the equations (2) and (3) are substituted in the equation (1) to simplify the equation (1), the following equation (4) is obtained:

$$V_0 = \frac{V_c}{2} - \frac{(R_y - R_x)\cos 2\theta}{2(R_x + R_y)} \cdot V_c \quad (4)$$

The equation (4) is further simplified as follows:

$$V_0 = A - B \cos 2\theta \cdot V_c \quad (5)$$

In the equation (5), the first coefficient A is $V_c/2$ and is a constant which is dependent on the power supply voltage $V_c$. The second coefficient B is $(R_y-R_x)/2(R_x+R_y)$ and is also a constant which is dependent on the material of the elements $R_A$ and $R_B$. From the equations (4) and (5), the output voltage Vo is related to the angle $\theta$ between the direction of the current flowing through the elements and the direction of the magnetic field 7, as shown in FIG. 6.

When the angle $\theta$ lies in a range of 0° to 90°, the output voltage Vo of the magneto-sensitive element 12 shows a 1:1 correspondence with the direction of the magnetic field 7, that is, the rotation angle of the throttle valve 2. The throttle angle sensor operates preferably within a range of $\theta=45°$ to $\theta=90°$ in FIG. 6. Thus, the magneto-sensitive element 12 is disposed at such a position that the throttle valve 2 is in its full closed position at $\theta=45°$. This is because, in the internal combustion engine, the throttle angle is required to be detected at higher accuracy in a range of from the full closed position to a relatively small opening angle of the throttle valve 2 than in a range where the opening angle of the throttle valve 2 is large.

An electrical circuit part 15 shown in FIG. 1 is a hybrid integrated circuit which has function of supplying the power supply voltage Vc to the magneto-sensitive element 12 and amplifying the output voltage Vo of the magneto-sensitive element 12 thereby converting a change in the direction of the magnetic field 7 into a corresponding change in an electrical signal.

Figure 7:
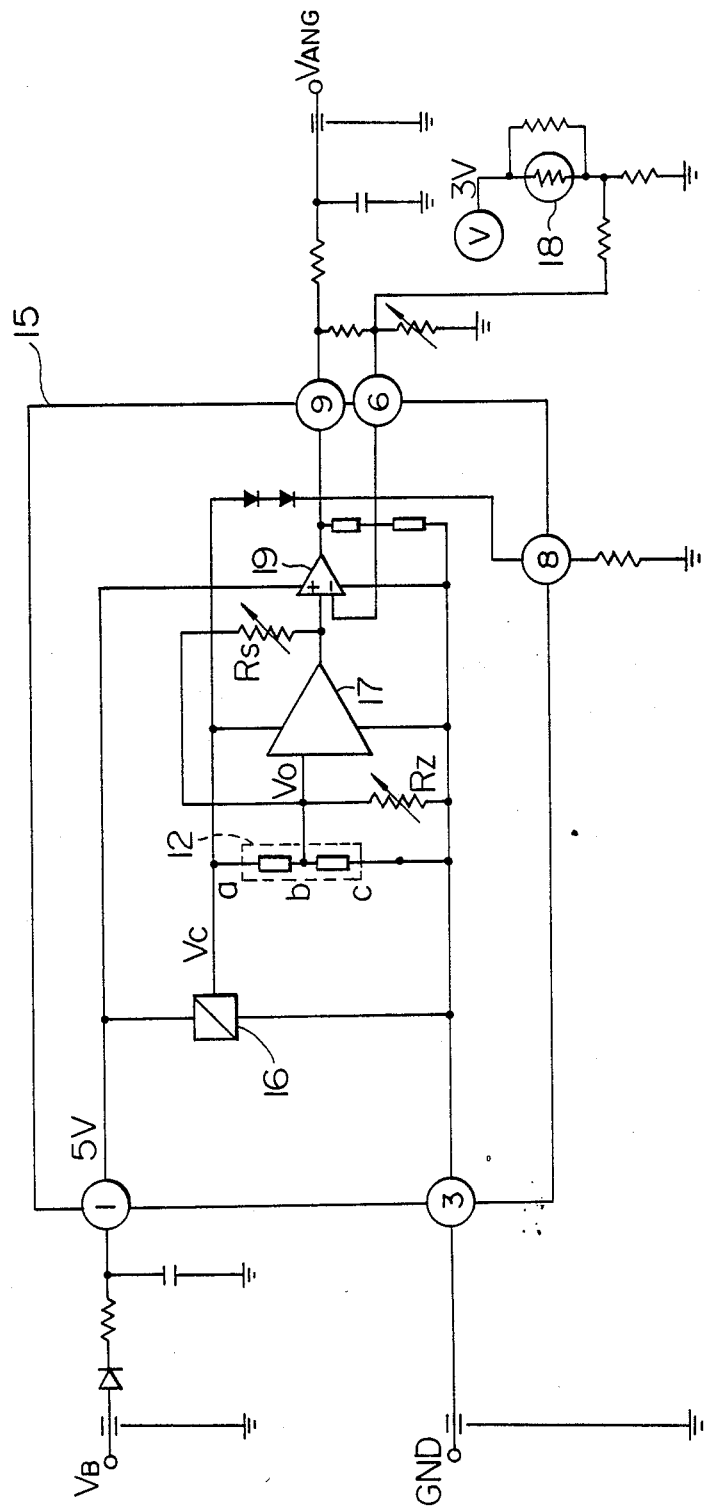
FIG. 7 is a circuit diagram of an electrical circuit part for converting the output of the magneto-sensitive element shown in FIG. 4 into an electrical signal corresponding to the throttle angle.

FIG. 7 is a circuit diagram of the electrical circuit part 15 which is such a hybrid integrated circuit. In FIG. 7, the integrated electrical circuit part is enclosed by the solid lines 15. A battery voltage $V_B$ is applied to an input terminal ① the electrical circuit part 15. A constant voltage circuit 16 regulates the battery voltage $V_B$ to set it at the desired constant voltage level Vc. This regulated voltage Vc is applied across the terminals a and c of the magneto-sensitive element 12 from the constant voltage circuit 16. The output voltage Vo appearing at the connection point b between the series-connect elements $R_A$ and $R_B$ constituting the magneto-sensitive element 12 is applied to an input terminal of an amplifier 17. A variable resistor $R_Z$ is connected to the input terminal of the amplifier 17 so that, by suitably changing the resistance value of the variable resistor $R_Z$, the zero level of the output of the amplifier 17 can be adjusted. Another variable resistor $R_S$ for adjusting the feedback constant is connected to the output terminal of the amplifier 17 so that, by suitable changing the resistance value of the variable resistor $R_S$, the amplification factor of the amplifier 17 can be adjusted. These variable resistors $R_Z$ and $R_S$ are provided so as to electrically adjust the input-output characteristic of the magneto-sensitive element 12 and to establish a proper relation between the direction of the magnetic field 7 and the electrical output of the magneto-sensitive element 12. The output voltage of the amplifier 17 is applied to a succeeding temperature compensation circuit composed of another amplifier 19 and a thermistor 18, and any variation of the output voltage due to the ambient temperature is compensated by the temperature compensation circuit. The resultant electrical output $V_{ANG}$ representing a change in the direction of the magnetic field 7, that is corresponding to the sensed throttle angle appears at an output terminal ⑨ connected to an external circuit. That is, this output $V_{ANG}$ is applied through the connector 10 to a control unit (not shown).

After the connector 10 having the magnetoresistive element 12, which acts as the magneto-sensitive element, is inserted into the hole 9 of the housing 8 and fixed in position, the throttle valve 2 is full closed, and, in such a state, the variable resistor $R_Z$ is adjusted until the electrical output $V_{ANG}$ shows its zero level. Then, the throttle valve 2 is full opened, and, in such a state, the variable resistor $R_S$ is adjusted until the electrical output $V_{ANG}$ shows its predetermined voltage level.

Figure 8:
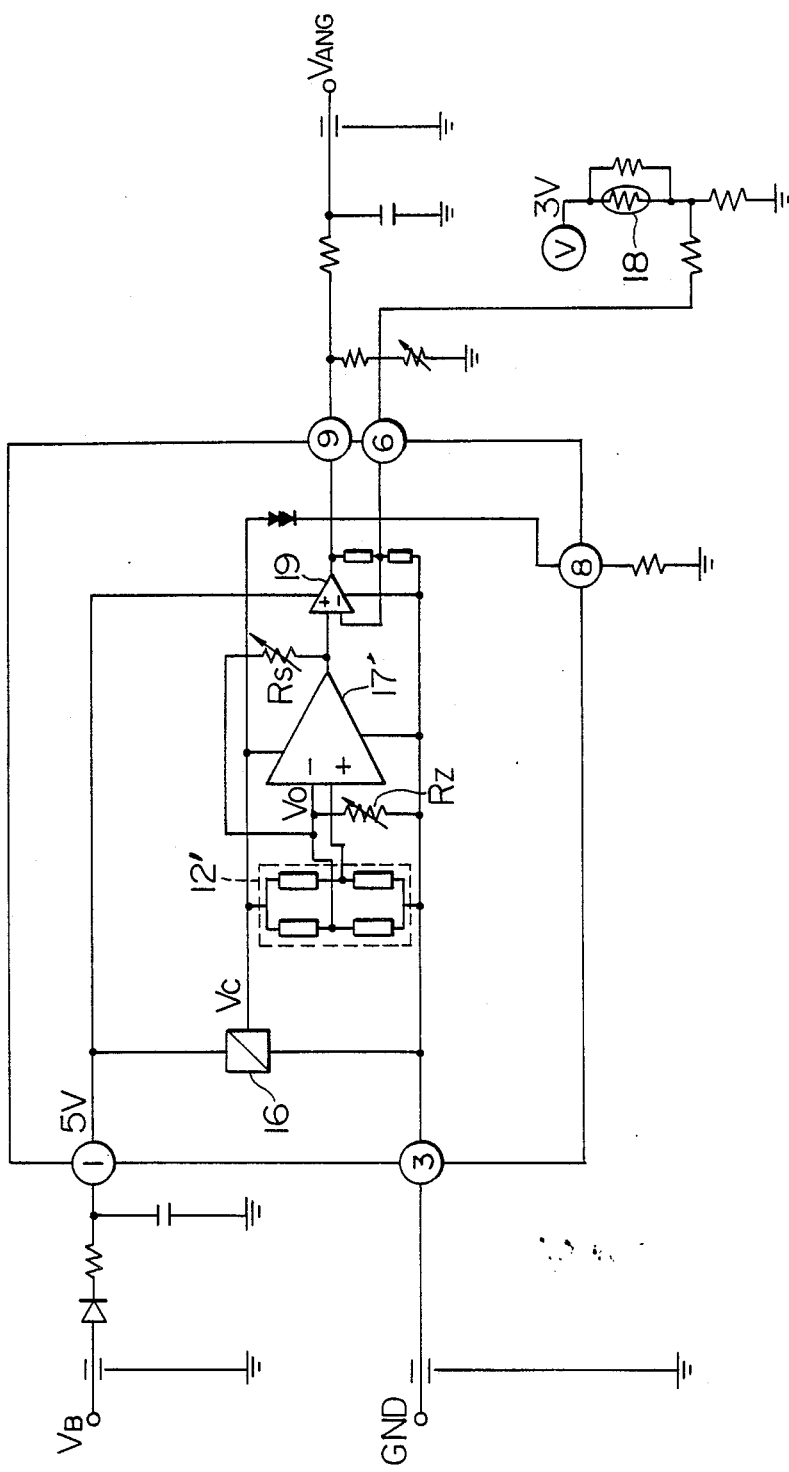
FIG. 8 is a circuit diagram of another form of the electrical circuit part in which four magnetoresistive elements are connected in a full bridge circuit.
Figure 9:
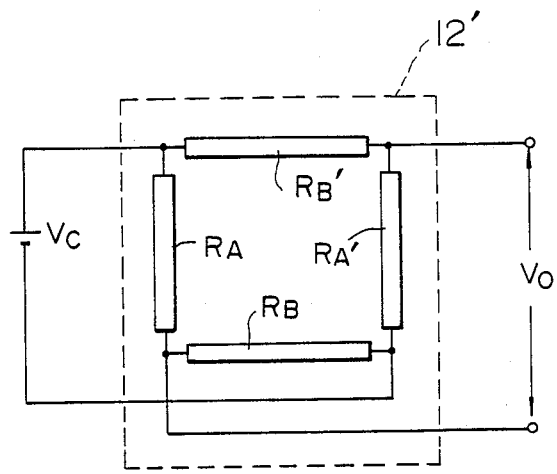
FIG. 9 shows in detail the full bridge connection of the magnetoresistive elements shown in FIG. 8.

FIG. 8 shows a modification of the electrical circuit part 15 shown in FIG. 7. In FIG. 8, four magneto-sensitive elements are connected in a full bridge circuit to constitute a magneto-sensitive element 12', and a resistance change in the bridge is detected to detect the direction of the magnetic field 7. FIG. 9 shows in detail the bridge connection of the magnetoresistive elements $R_A$, $R_B$, $R_A'$ and $R_B'$. The magneto-sensitive element 12' applies its output Vo to an inverted input terminal and a non-inverted input terminal of a differential amplifier 17'. As in the case of the circuit shown in FIG. 7, the variable resistors $R_Z$ and $R_S$ are adjusted to adjust the zero level and maximum level of the output of the amplifier 17'.

A second embodiment of the present invention using a Hall effect element as a part of the throttle angle sensor will now be described.

Figure 10:
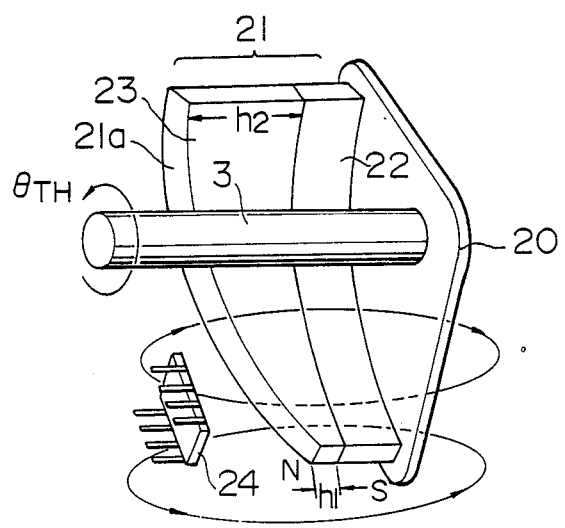
FIG. 10 shows the structure of part of a second embodiment of the throttle angle sensor in which a Hall effect element is used as a magneto-sensitive element.

FIG. 10 shows schematically the structure of such a throttle angle sensor including a Hall effect element, and, in FIG. 10, like reference numerals are used to designate like parts appearing in FIG. 1.

Referring to FIG. 10, a throttle valve 2 is fixedly mounted on a shaft 3, and a magnetic field source 21 supported on a supporting member 20 of a material such as iron or aluminum is composed of a permanent magnet 22 and a yoke 23. The yoke 23 has a radius generally equal to that of the permanent magnet 22 and is bonded at one of its side surfaces to the permanent magnet 22. The yoke 23 is made of a ferromagnetic material and magnetized in the same direction as the axial direction of the throttle valve shaft 3. The side surface 21a of the yoke 23 remote from the side surface bonded to the permanent magnet 22 is progressively spaced apart from the permanent magnet 22 so that the width of the yoke 23 changes continuously from $h_1$ to $h_2$ ($h_1 \neq h_2$) in the circumferential direction as shown in FIG. 10. A Hall effect element 24 is disposed opposite to the side surface 21a of the yoke 23. The magnetic field source 21 generates a magnetic flux $\phi$ which penetrates the Hall effect element 24. Since the width of the yoke 23 changes from $h_1$ to $h_2$, the gap between the side surface 21 of the yoke 23 and the Hall effect element 24 changes with the rotation of the throttle valve shaft 3. Thus, when the throttle valve shaft 3 rotates to change the opening angle of the throttle valve 2, and the gap between the yoke 23 and the Hall effect element 24 changes in an amount corresponding to the rotation angle $\phi_{TH}$, the Hall effect element 24 generates an output voltage corresponding to change in the density of the magnetic flux $\phi$ flowing through the Hall effect element 24.

Figure 11A:
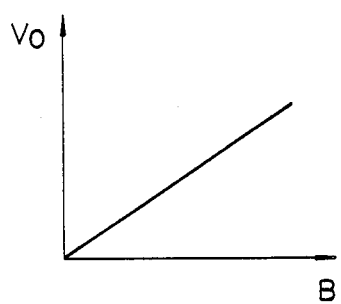
FIGS. 11A to 11D show various characteristics of the Hall effect element.
Figure 11B:
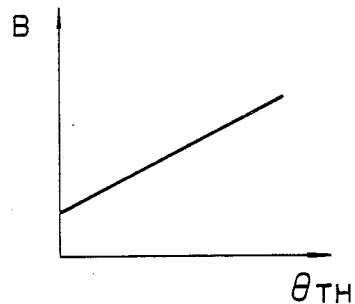
Figure 11C:
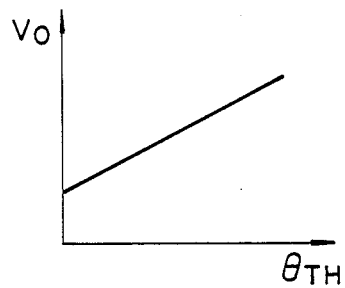
Figure 11D:
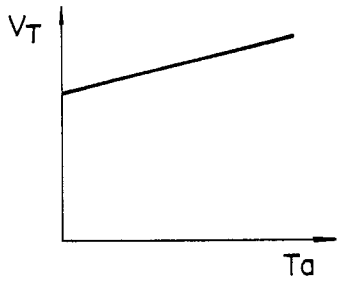
Figure 11E:
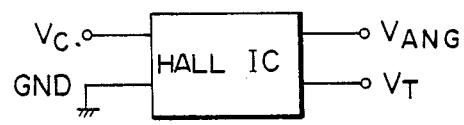
FIG. 11E shows a four-terminal Hall IC.

Various characteristics of the Hall effect element 24 are shown in FIGS. 11A to 11D. FIG. 11A shows how the output voltage Vo of the Hall effect element 24 changes relative to the magnetic flux density B, and FIG. 11B shows how the magnetic flux density B changes relative to the rotation angle $\theta_{TH}$ of the throttle valve shaft 3. Similarly, FIG. 11C shows how the output voltage Vo of the Hall effect element 24 changes relative to the rotation angle $\theta_{TH}$ of the throttle valve shaft 3. Also, FIG. 11D shows how a voltage $V_T$ proportional to the internal temperature of the Hall effect element 24 changes relative to the ambient temperature Ta. Usually, the Hall effect element 24 is available in the form of a Hall IC in which the Hall effect element is integrated together with other circuit elements. The voltage $V_T$ shown in FIG. 11D is measured as a terminal voltage of such a Hall IC. FIG. 11E shows one form of the Hall IC having four terminals.

FIG. 12 shows a typical example of temperature characteristics of a permanent magnet and a Hall IC. The curve (a) represents a temperature characteristic of an output voltage Vo of a silicon type Hall IC relative to an ambient temperature Ta, and it will be seen that $\Delta Vo/Vo$ shows generally a positive temperature coefficient. This temperature coefficient is, for example, about $+0.05\%/°$ C. The curve (b) shows how the magnetic flux density B of a rare earth permanent magnet changes relative to the ambient temperature Ta. The temperature coefficient is, for example, about $-0.04\%/°$ C. and does not appreciably fluctuate when compared to that of the silicon type Hall IC. These polarities and magnitudes of the temperature coefficients of the permanent magnet and the Hall IC are noted in the present invention, and the Hall IC is combined with the permanent magnet so as to provide a throttle angle sensor whose temperature dependence is quite little.

Figure 13:
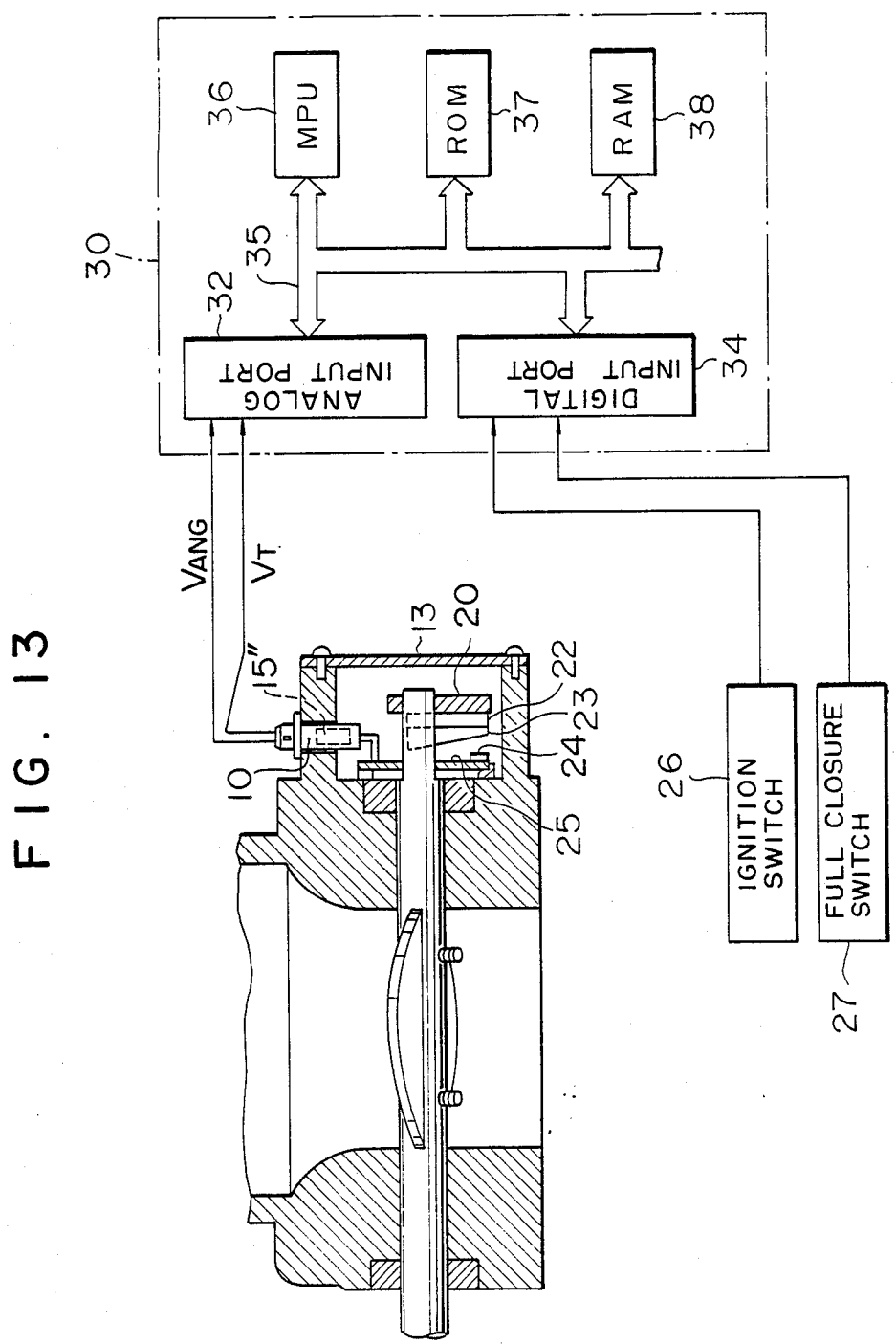
FIG. 13 shows the general structure of the second embodiment of the throttle angle sensor using the Hall effect element as the magneto-sensitive element.

FIG. 13 shows the general structure of the second embodiment of the present invention.

Figure 14:
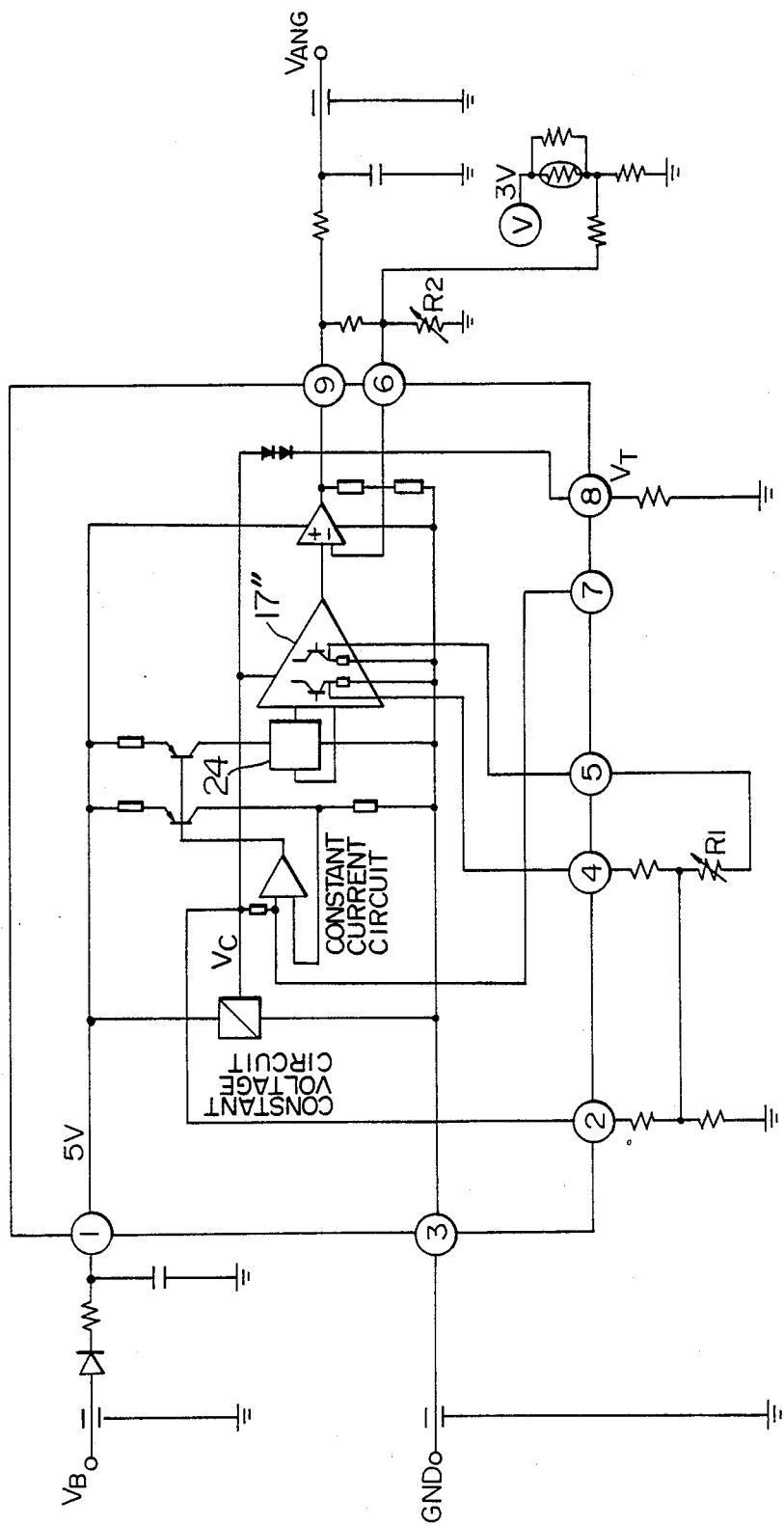
FIG. 14 is a circuit diagram of an electrical circuit part preferably employed for the throttle angle sensor using the Hall effect element as the magneto-sensitive element.

Referring to FIG. 13, the Hall IC 24 is disposed on a substrate 25 and electrically connected to an input terminal of an electrical circuit part 15" by a wiring extending from the substrate 25. The electrical circuit part 15" is connected at its output to an external control unit 30 through an electrical connector 10. FIG. 14 is a circuit diagram of the electrical circuit part 15". A constant current is supplied to the Hall IC 24 from a constant current circuit. Two outputs from the Hall IC 24 are applied to a differential amplifier 17". Variable resistors $R_1$ and R are provided to adjust the zero level and maximum level respectively of an output voltage $V_{ANG}$ of the electrical circuit part 15". The manner of level adjustment is similar to that described already with reference to FIG. 7.

The control unit 30 shown in FIG. 13 executes arithmetic processing for the purpose of temperature compensation of the output voltage $V_{ANG}$ of the electrical circuit part 15" so as to provide a temperature-compensated throttle angle signal. Referring to FIG. 13, the output $V_T$ related to the ambient temperature and required for temperature compensation is applied together with the output $V_{ANG}$ from the electrical circuit part 15" to an analog input part 32 of the control unit 30 to be converted into digital signals respectively. Also, output signals of an ignition switch 26 and a switch 27 sensing the full closed position of the throttle valve 2 are applied to a digital input port 34 of the control unit 30. A microprocessor (MPU) 36, a read-only memory (ROM) 37, a random access memory (RAM) 38 and a bus line 35 constitute a microcomputer. The microcomputer executes processing for the purpose of temperature compensation and executes also processing for the purpose of compensation of secular variations of the output characteristics of the Hall IC 24 according to a program stored in the ROM 37.

According to the present invention, the permanent magnet 22 and the Hall IC 24 are combined so that their temperature coefficients cancel each other, thereby providing a throttle angle sensor showing a good temperature characteristic as shown by, for example, the curve (c) in FIG. 12. However, the output voltage $V_{ANG}$ is not necessarily adjustment-free because the temperature coefficient of the output characteristic of the Hall IC tends to fluctuate. Therefore, correction of the temperature coefficient becomes necessary. The manner of temperature coefficient correction will now be described.

Figure 15A:
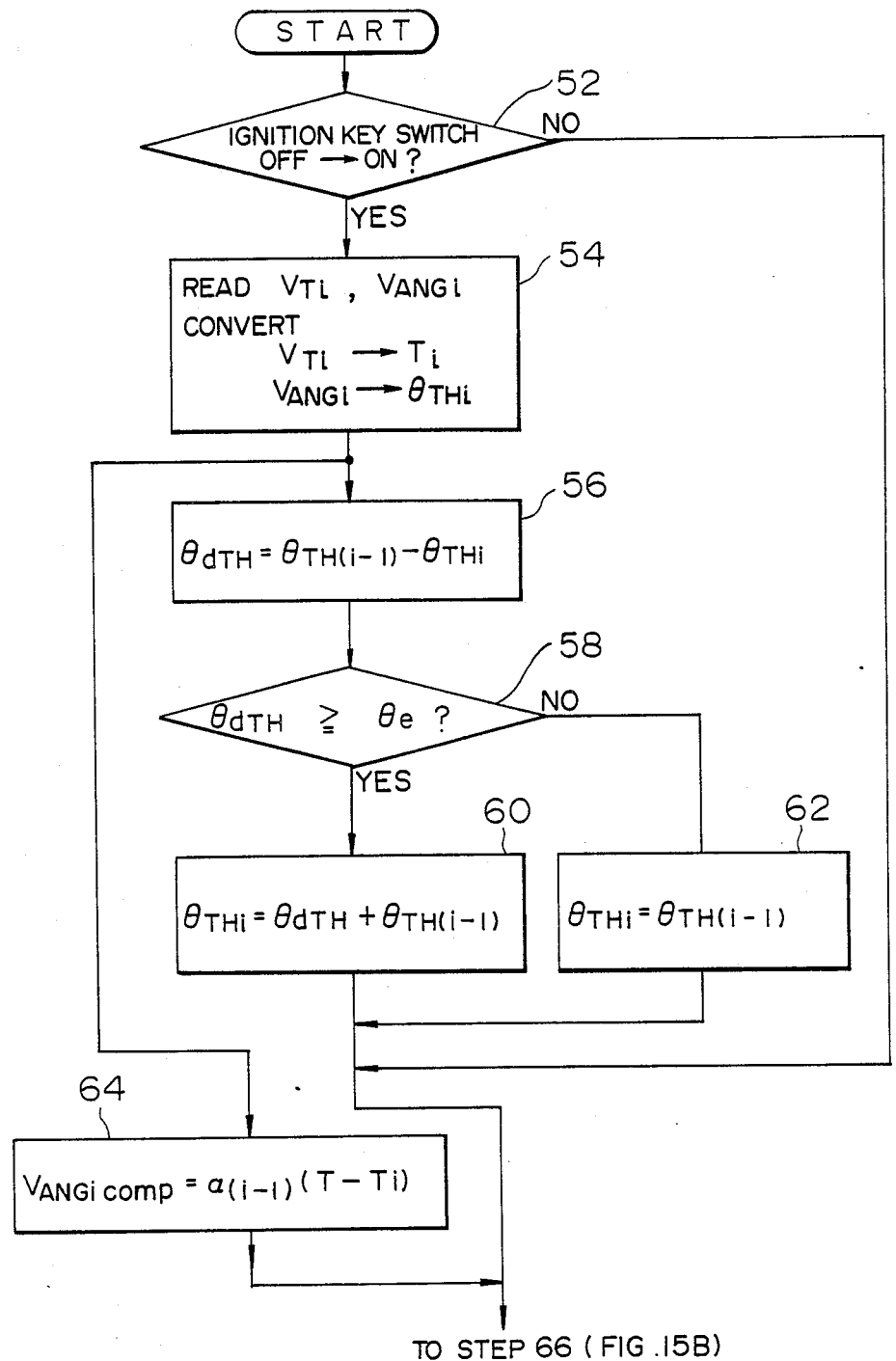
FIGS. 15A to 15C are a flow chart used for the computation of a temperature coefficient.
Figure 15B:
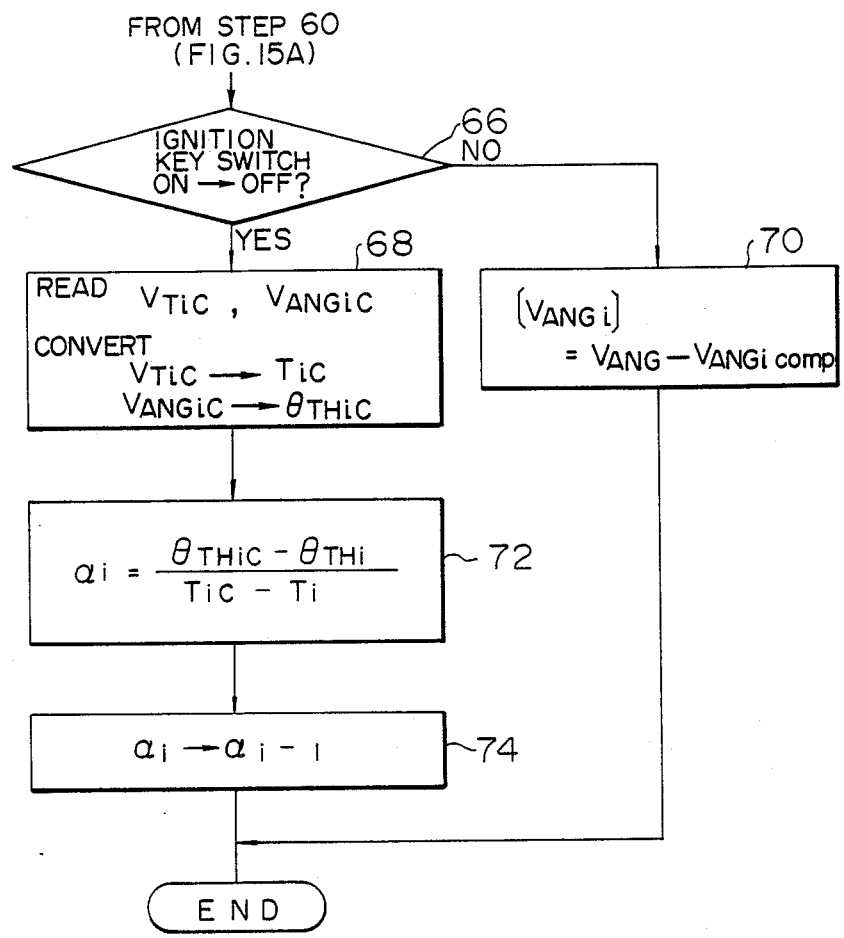

FIGS. 15A and 15B are a flow chart of a method for computing and correcting the temperature coefficient at the full closed position of the throttle valve 2 by processing in the MPU 36.

In a step 52 in FIG. 15A, whether or not the ignition key switch has been turned on from its off state is decided on the basis of the output signal of the ignition switch 26. Describing in more detail, the output signal of the ignition switch 26 shown in FIG. 13 is applied to the digital input port 34 of the control unit 30, and the MPU 36 decides whether or not the ignition key switch has been turned on from its off state. When the result of decision made in the step 52 proves that the ignition key switch has been turned on, the voltage $V_T$ representing the internal temperature of the Hall IC 24 and the output voltage $V_{ANG}$ of the electrical circuit 15" are read through the analog input port 32 of the control unit 30. As a general expression, symbols $V_{Ti}$ and $V_{ANGi}$ are used to indicate that they are values read at the time of an i-th off→on operation of the ignition key switch. (In the following description, this suffix i is used in the same sense.) After the analog-digital conversion of the voltages $V_{Ti}$ and $V_{ANGi}$, the internal temperature Ti of the Hall IC 24 and the angle $\theta_{THi}$ of the shaft 3 of the throttle valve 2 are computed in the MPU 36.

The engine starts to operate, and the internal temperature of the engine rises. Suppose that Ti is the internal temperature (computed from $V_T$) of the Hall IC 24 at that time. Then, the required amount of temperature compensation can be expressed as $V_{ANGicomp}$ shown in a step 64. In the step 64, $\alpha_{(i-1)}$ represents the temperature coefficient computed at the time of the (i−1)th off→on operation of the ignition key switch. The value of $V_{ANGicomp}$ changing with time is shown in FIG. 16. Until the ignition key switch is turned off from its on state, the output voltage $V_{ANG}$ of the electrical circuit 15' is corrected by the temperature compensation component $V_{ANGcomp}$, and the corrected value is expressed as $[V_{ANGi}] = (V_{ANG} - V_{ANGicomp})$ as shown in a step 70.

In response to the i-th off→on operation of the ignition key switch, the temperature coefficient $\alpha_i$ is computed in a manner as described below.

In a step 56, $\theta_{dTH}$ is computed from the equation $\theta_{dTH} = \theta_{TH(i-1)} - \theta_{THi}$, where $\theta_{TH(i-1)}$ represents the angle of the shaft 3 of the throttle valve 2 computed at the time of the (i−1)th off→on operation of the ignition key switch. Thus, $\theta_{dTH}$ represents the difference between the angle $\theta_{TH(i-1)}$ computed at the time of the (i−1)th off→on operation of the ignition key switch and the throttle angle $\theta_{THi}$ computed in the step 54. The above computation is based on the premise that the ambient temperature or the internal temperature of the Hall IC 24 does not appreciably change when the ignition key switch is in its off state. The step 56 is followed by a step 58 in which decision is made as to whether or not the relation $|\theta_{dTH}| \geq \theta_e$ holds, where $\theta_e$ is a predetermined value. When the result of decision in the step 58 proves the $|\theta_{dTH}| \geq \theta_e$, the throttle valve shaft angle $\theta_{THi}$ at the time of the i-th off→on operashaftion of the ignition key switch is computed in a step 60. That is, $\theta_{THi} = \theta_{dTH} + \theta_{TH(i-1)}$ is computed in the step 60. Therefore, $\theta_{THi}$ obtained in the step 60 represents the corrected angle of the throttle valve shaft 3.

On the other hand, when the result of decision in the step 58 proves that $|\theta_{dTH}| < \theta_e$, it is assumed that the throttle valve shaft angle $\theta_{dTH}$ computed at the time of the i−th off→on operation of the ignition key switch is equal to the throttle valve shaft angle $\theta_{TH(i-1)}$ computed at the time of the (i−1)th off→on operation, as shown in a step 62.

Therefore, $\theta_{THi}$ obtained in the step 62 represents also the corrected angle of the throttle valve shaft 3. The throttle valve shaft angle $\theta_{THi}$ obtained in each of the steps 60 and 62 is used for the computation of the temperature coefficient and is also stored in, for example, the RAM 38 to be used for the computation at the time of the next or (i+1)th off→on operation of the ignition key switch. The computation program is stored in the ROM 37.

Then, when the on→off operation of the ignition key switch is detected in a step 66 in FIG. 15B, the internal temperature voltage $V_{Tic}$ and output voltage $V_{ANGic}$ of the electrical circuit 15″ immediately after the on→off operation of the ignition key switch are read in a step 68 and are converted into the corresponding temperature $T_{ic}$ and throttle valve shaft angle $\theta_{THic}$ respectively. In the step 66, the fact that the ignition key switch has been turned off from its on state may be decided by taking the logical product of the output signal of the ignition switch 26 and that of the switch 27 sensing the full closed position of the throttle valve 2. This provides the merit of improving the accuracy of decision of the full closed position of the throttle valve 2.

In a step 72, the temperature coefficient $\alpha_i$ at the time of the i−th off→on operation of the ignition key switch is computed. As seen in the step 72, this temperature coefficient $\alpha_i$ is a mean value computed on the basis of signals representing a relatively low temperature Ti and a throttle valve shaft angle $\theta_{THi}$ at the time of starting the engine and signals representing a relatively high temperature $T_{ic}$ and a throttle valve shaft angle $\theta_{THic}$ at the time of stopping the engine. The temperature coefficient $\alpha_i$ computed in the step 72 is used for correction at the time of the (i+1)th off→on operation of the ignition key switch. In a step 74, the temperature coefficient $\alpha_{i-1}$ stored in the RAM 38 is replaced by the temperature coefficient $\alpha_i$.

Thus, in the method described above, the internal temperature of the Hall IC 24 and the throttle valve shaft angle in the full closed position of the throttle valve 2 are based to compute the temperature coefficient $\alpha$. This method is simple and yet excellent for computing the temperature coefficient to be used for correction. It is to be noted that the temperature coefficient $\alpha$ described above represents the composite value of the combination of the permanent magnet 22, yoke 23 and Hall IC 24.

Therefore, the temperature characteristic of the permanent magnet 22 of a rear earth element and that of the Hall IC 24 of silicon cancel each other, and the resultant temperature characteristic is corrected by the temperature coefficient $\alpha$ computed in the manner described above.

Figure 15C:
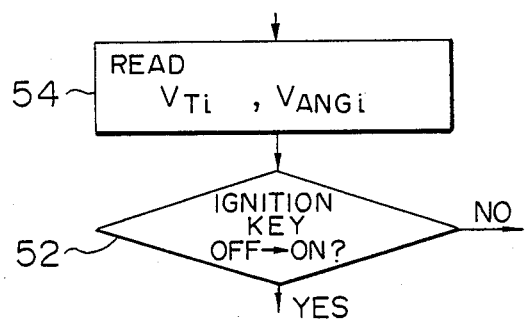

In the flow chart of FIG. 15A, the values of $V_T$ and $V_{ANG}$ are read after deciding that the ignition key switch has been turned on from its off state. However, the values of $V_T$ and $V_{ANG}$ immediately before the ignition key switch is turned on from its off state may be read so as to similarly compute the temperature coefficient. In such a case, the step 54 is followed by the step 52 as shown in FIG. 15C. The remaining steps are similar to those shown in FIGS. 15A and 15B, and any detailed description will be unnecessary.

In the flow chart shown in FIGS. 15A and 15B, the temperature coefficient at the full closed position of the throttle valve 2 is computed. However, the temperature coefficient at the full open position of the throttle valve 2 can be similarly computed as described with reference to a flow chart of FIG. 17.

Figure 17:
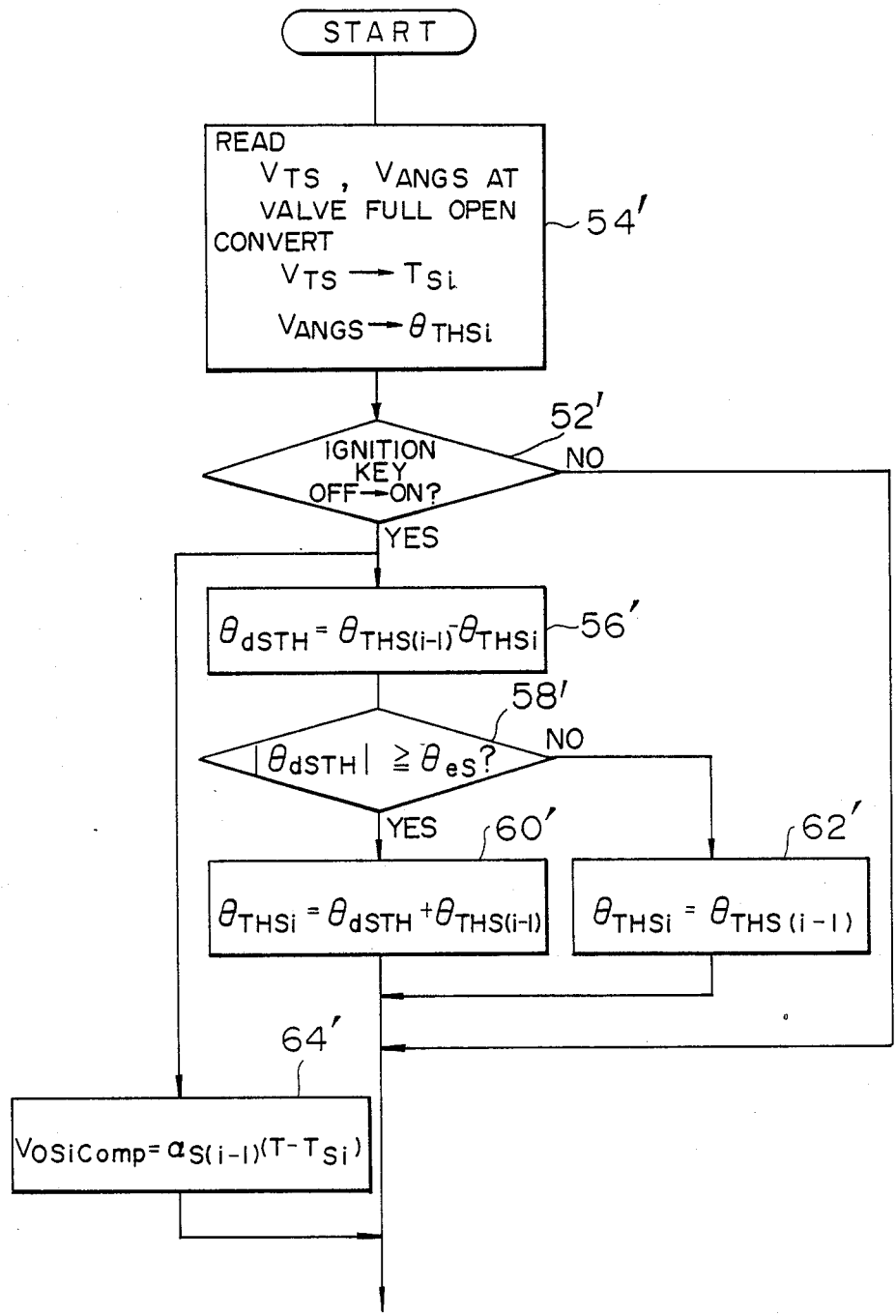
FIG. 17 is a flow chart used for the computation of the temperature coefficient when the throttle valve is in its full open position.

In FIG. 17, the symbols corresponding to those shown in FIG. 15A are provided with a suffix S to indicate that the throttle valve 2 is in its full open position. Also, in FIG. 17, dashes are attached to individual steps corresponding to those shown in FIG. 15A.

In a step 54′, the throttle valve 2 is full opened immediately before the ignition key switch is turned on from its off state, and the values of $V_{TS}$ and $V_{ANGS}$ at that time are read. When so required, a switch sensing the full open position of the throttle valve 2 may be provided in addition to the switch 27 shown in FIG. 13, so as to more accurately decide that the throttle valve 2 is in its full open position. Steps 52′ and 56′ to 64′ correspond exactly to those shown in FIG. 15A in the manner of processing, and any detailed description will be unnecessary. Processing corresponding to that executed in the step 68 shown in FIG. 15B will be specifically described.

The values of voltages $V_{TS}$ and $V_{ANGS}$ corresponding to the respective voltages $V_{Tic}$ and $V_{ANGic}$ are read after the throttle valve 2 is moved to its full open position after the ignition key switch has been turned off from its on state. Then, processing corresponding to that in the step 72 is executed to compute a temperature coefficient $\alpha_{is}$, and this temperature coefficient $\alpha_{is}$ is used at the time of the (i+1)th off→on operation of the ignition key switch. Processing in steps corresponding to the steps 70 and 74 shown in FIG. 15B is similar to those executed in those steps 70 and 74, and any detailed description will be unnecessary.

When the temperature coefficients $\alpha_i$ and $\alpha_{is}$ described above have already been computed, the mean value of $\alpha_i$ and $\alpha_{is}$ may be used as a mean temperature coefficient in a variable temperature range.

Further, when the nonlinearity of the temperature coefficient is considered, a plurality of temperature coefficients in a plurality of temperature ranges respectively may be computed and stored in the ROM 37, so that the temperature coefficient corresponding to the detected temperature range can be used for correction. An example of the relation between the temperature coefficient $\alpha$ and the temperature T is shown in Table 1.

TABLE 1

| α | | | | |
|---|---|---|---|---|
| Full open | $\alpha_{IS}$ | $\alpha_{IIS}$ | $\alpha_{IIIS}$ | |
| Full closed | $\alpha_I$ | $\alpha_{II}$ | $\alpha_{III}$ | |
| | $T_1 < T \leq T_2$ | $T_2 < T \leq T_3$ | $T_3 < T \leq T_4$ | |
| | | $V_T \to T$ | | |

When the temperature T computed by converting the voltage $V_T$ has the relation $T_1 < T \leq T_2$ (where $T_1$ and $T_2$ are predetermined temperatures and $T_1 < T_2$), the temperature coefficient $\alpha_I$ or $\alpha_{IS}$ is selected in Table 1 depending on whether the throttle valve 2 is in its full closed position or in its full open position. Similarly, when the temperature T has the relation $T_2 < T \leq T_3$ (where $T_3$ is also a predetermined temperature and $T_2 < T_3$), the temperature coefficient $\alpha_{II}$ or $\alpha_{IIS}$ is selected. Also when the temperature T has the relation $T_3 < T \leq T_4$ (where $T_4$ is also a predetermined temperature and $T_3 < T_4$), the temperature coefficient $\alpha_{III}$ or $\alpha_{IIIS}$ is selected. The difference between the predetermined temperatures $T_1$, $T_2$, $T_3$ and $T_4$ may be or may not be equal. Where the temperature coefficient α is nonlinear, the temperature range may be selected to be as wide as possible, provided that the temperature coefficient α does not appreciably change.

Figure 18:
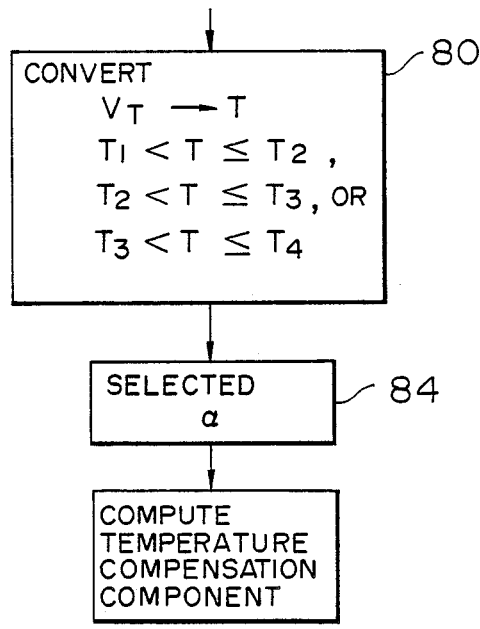
FIG. 18 is a flow chart used when Table 1 is selected.

FIG. 18 is a flow chart employed when the various values shown in Table 1 are stored in the ROM 37 of the control unit 30.

In a step 80, the MPU 36 decides the temperature range to which the detected temperature T belongs, and reads out the corresponding temperature coefficient α in Table 1 from the ROM 37. In a step 84, the temperature T is compensated using the selected temperature coefficient α. The temperature coefficient e may be a mean value of those computed in both the full closed position and the full open position of the throttle valve 2. According to the above method, the temperature T can be compensated while taking into account the nonlinearity of the temperature coefficient α.

In the flow chart of FIG. 18, various values of the temperature coefficient α are previously stored in the form of the table in the ROM 37. However, various values of the temperature coefficient α approximated by a function α=f(T) may be previously stored in the ROM 37, and the value of the temperature coefficient α may be computed according to T. In such a case, highly accurate temperature compensation can be made when the function is satisfactorily approximated.

The throttle valve 2 is more frequently used in a range of relatively small opening angles than in a range of large opening angles. Therefore, when, in addition to the values of the temperature coefficient α based on the full closed position of the throttle valve 2 as described in the flow chart of FIGS. 15A and 15B, the values of the temperature coefficient α in the range of the relatively small angles of the shaft 3 of the throttle valve 2 are computed and used for temperature compensation, the temperature can be compensated with higher accuracy as will be described now with reference to FIG. 19.

Figure 19:
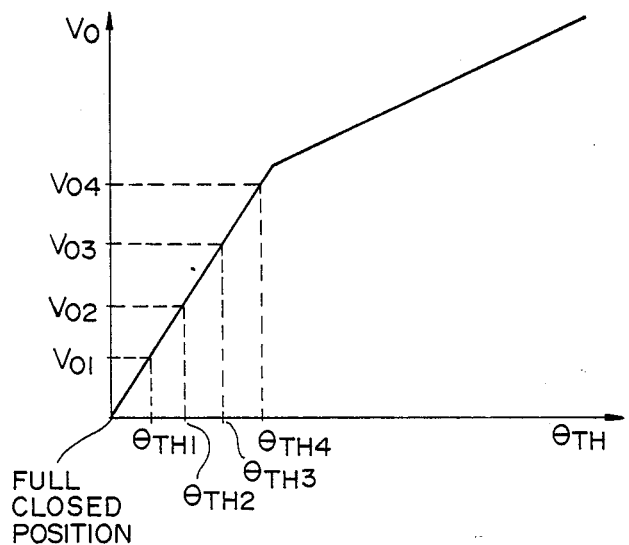
FIG. 19 illustrates the basis for computation of the temperature coefficient when the opening angle of the throttle valve is relatively small.

FIG. 19 shows the relation between the opening angle $\theta_{TH}$ of the throttle valve 2 and the output voltage Vo of the Hall IC 24. The detection sensitivity in a small throttle angle range between the full closed position and an angle $\theta_{TH4}$ of the shaft 3 of the throttle valve 2 is frequently selected to be different from that in the remaining throttle angle range. This can be realized by changing the shape of the side surface 21a of the yoke 23 opposite to the Hall IC 24 shown in FIG. 10. That is, the dimensions $h_1$ to $h_2$ of the width of the yoke 23 are suitably changed to attain the purpose.

A first method for temperature compensation includes computing the temperature coefficient α at the full closed position of the throttle valve 2 (for example, according t the flow chart of FIGS. 15A and 15B), computing the temperature coefficient α at the throttle shaft angle $\theta_{TH4}$, and using the mean value for the temperature compensation.

That is, according to the first method, an output voltage Vo of the Hall IC 24 at a temperature $T_{20}$ is read while fixing the throttle value shaft angle at $\theta_{TH4}$. Then, an output voltage $V_{130}$ of the Hall IC 24 at a temperature $T_{130}$ is read to compute a temperature coefficient $\alpha_L$ according to the equation $\alpha_L = (\theta_{TH4} \int \theta_{TH130})/(T_{130} - T_{20})$ Similarly, for all of throttle valve shaft angles $\theta_{TH1}$, $\theta_{TH2}$ and $\theta_{TH3}$, temperature coefficients $\alpha_1$, $\alpha_2$ and $\alpha_3$ are computed respectively. Then, when the mean value of the temperature coefficients $\alpha_i$, $\alpha_1$, $\alpha_2$, $\alpha_3$ and $\alpha_L$ is used for the temperature compensation in the small throttle angle range, the temperature can be compensated with higher accuracy.

According to a second method, the throttle angle range between the full closed position and the angle $\theta_{TH4}$ of the shaft 3 of the throttle valve 2 is divided into a plurality of sub-ranges, and the temperature coefficients $\alpha_i$, $\alpha_1$, $\alpha_2$, $\alpha_3$ and $\alpha_L$ are allotted to these sub-ranges respectively. For example, the throttle shaft angle range is divided into sub-ranges as shown in Table 2, and the temperature coefficient α corresponding to the throttle valve shaft angle $\theta_{TH}$ computed on the basis of the output Vo of the Hall IC 24 is selectively allotted to one of the sub-ranges as shown in Table 2.

TABLE 2

| Vo → $\theta_{TH}$ | α |
|---|---|
| $\theta_{THi} < \theta_{TH} \leq \theta_{TH1}$ | $\alpha_i$ |
| $\theta_{TH1} < \theta_{TH} \leq \theta_{TH2}$ | $\alpha_1$ |
| $\theta_{TH2} < \theta_{TH} \leq \theta_{TH3}$ | $\alpha_2$ |
| $\theta_{TH3} < \theta_{TH} \leq \theta_{TH4}$ | $\alpha_3$ |
| $\theta_{TH4} < \theta_{TH}$ | $\alpha_L$ |

Table 2 is previously stored in the ROM 37 of the control unit 30, and the optimum temperature coefficient α is selected according to a method as described with reference to FIG. 18. In this case, the temperature coefficient α corresponding to the throttle valve shaft angle $\theta_{TH}$ is selected on the basis of the result of temperature compensation.

In the second method, the temperature coefficient u corresponding to the throttle valve shaft angle $\theta_{TH}$ is selected. However, any one of the temperature coefficients α shown in Table 2 may be allotted to any one of the sub-ranges when the difference between the maximum and minimum values of $\alpha_i$, $\alpha_1$, $\alpha_2$, $\alpha_3$ and $\alpha_L$ is smaller than a predetermined value. In such a case, a specific one only of the temperature coefficients $\alpha_i$, $\alpha_1$, $\alpha_2$, $\alpha_3$ and $\alpha_L$ may be selected. For example, the temperature coefficient $\alpha_i$ may be specifically selected, and, only when the difference between the maximum and minimum values of $\alpha_i$ is larger than a predetermined value, the temperature coefficients $\alpha_i$, $\alpha_1$, $\alpha_2$, $\alpha_3$ and $\alpha_L$ may be selected according to Table 2.

The manner of temperature compensation described above is, as it were, temperature compensation according to programed processing and can sufficiently deal with fluctuations of the temperature characteristics of the permanent magnet and Hall IC. In the flow charts of FIGS. 15A, 15B and 17, the temperature coefficient is computed each time the ignition key switch is turned on. Therefore, the temperature can be reliably compensated regardless of secular variations of the output characteristic of the Hall IC, so that the throttle valve shaft angle can be detected with high accuracy.

Further, more optimum temperature compensation can be achieved when the method described with reference to Table 2, which uses the temperature coefficient corresponding to the throttle valve shaft angle, is combined with the method described with reference to FIGS. 15A and 15B or FIG. 17.

The aforementioned embodiments have referred, by way of example, to the combination of a magnetic circuit and a Hall effect element which have temperature coefficients of different polarities so that their temperature characteristics cancel each other. However, the merit of the method of computing the temperature coefficient of the Hall effect element and compensating the temperature on the basis of the computed temperature coefficient is only that the combination described above is advantageous for decreasing the factor required for temperature compensation. Therefore, the manner of temperature compensation according to the present invention is in no way limited to such a combination.

What is claimed is:

1. An angle sensor for a throttle valve of an internal combustion engine, comprising:
    a permanent magnet disposed on one end of the shaft of the throttle valve so as to generate a parallel magnetic flux and so that the direction of the magnetic flux rotates with the rotation of said throttle valve shaft;
    a throttle body accommodating said throttle valve;
    a cavity formed as an integral part of said throttle body to freely rotatably accommodate said permanent magnet and communicating with a bore through which said throttle valve shaft extends;
    a magneto-sensitive element in the form a magnetoresistive element disposed in said cavity in a relation substantially parallel to the magnetic-flux appearing surface of said permanent magnet and spaced apart from said permanent magnet so as to undergo a change in resistance in response to a change in the magnetic flux density as a result of the rotation of said permanent magnet; and
    an electrical circuit including an amplifier for receiving and amplifying the output of said magneto-sensitive element so as to convert a detected change in said magnetic flux density into a corresponding change in an electrical signal and including means for detecting a change in the resistance value of said magnetoresistive element and producing an electrical signal corresponding to the detected change in the direction of said magnetic flux, thereby converting the resistance value of said magneto-resistive element into a corresponding electrical signal, and means for separately adjusting the zero level of an output signal of said amplifier and adjusting the amplification actor of an input signal of said amplifier.

2. An angle sensor for a throttle valve of an internal combustion engine, comprising:
    a permanent magnet disposed on one end of the shaft of the throttle valve so as to generate a magnetic field and so that its position changes with the rotation of said throttle valve shaft;
    a throttle body accommodating said throttle valve;
    a cavity formed as an integral part of said throttle body to freely rotatably accommodate said permanent magnet and communicating with a bore through which said throttle valve shaft extends;
    a Hall effect element disposed in said cavity in a relation intersecting said magnetic field of said permanent magnet and spaced apart from said permanett magnet so as to detect a change in the magnetic field intensity as a result of the rotation of said permanent magnet;
    means for changing the distance between said permanent magnet and said Hall effect element with the rotation of said throttle valve so that the output voltage level of said Hall effect element changes in correspondence with a change in the magnetic field intensity; and
    an electrical circuit including an amplifier for receiving and amplifying the output of said Hall effect element so as to convert the detected change in the magnetic field intensity into a corresponding change in an electrical signal, including means for detecting a change in the output voltage level of said Hall effect element and producing an electrical signal corresponding to the detected change in the intensity of said magnetic field, and means for separately adjusting the zero level of an output signal of an amplifier and adjusting the amplication factor of an input signal of said amplifier.

3. An angle sensor according to claim 2, wherein said permanent magnet and said Hall effect element are selected so that they have temperature coefficients of respectively opposite polarities.

4. An angle sensor according to claim 3, wherein a rare earth permanent magnet is selected as said permanent magnet, and a Hall IC of silicon is selected as said Hall effect element.

5. A method of determining the temperature compensation coefficient an angle sensor as claimed in claim 4, comprising the steps of:
    (a) computing the angle of said throttle valve shaft on the basis of the temperature and output voltage of said Hall effect element detected at the time of turning on an ignition key switch from its off state;
    (b) computing the angle of said throttle valve shaft on the basis of the temperature and output voltage of said Hall effect element detected at the time of turning off said ignition key switch from its on state during the operation of said engine after the step (a); and
    (c) computing a temperature coefficient at the time of an i-th engine starting operation on the basis of the values of the temperature of said Hall effect element and the values of the angle of said throttle valve shaft detected and computed in the steps (a) and (b), said temperature coefficient computed at the time of the i-th engine starting operation being used as a temperature coefficient at the time of an (i+1)th engine starting operation.

6. A method according to claim 5, wherein, in said step (a), the angle of said throttle valve shaft is computed on the basis of the temperature and output voltage of said Hall effect element detected immediately before said ignition key switch is turned on from its off state.

7. A method according to claim 6, wherein the temperature of said Hall effect element is computed on the basis of a voltage representing the internal temperature of said Hall effect element.

8. A method according to claim 5, wherein said temperature coefficient at the time of the i-th engine starting operation is computed by the steps of:
(a) computing the angle of said throttle valve shaft on the basis of the temperature and output voltage of said Hall effect element detected when said throttle valve is full opened immediately before said ignition key switch is turned on from its off state;
(b) computing the angle of said throttle valve shaft on the basis of the temperature and output voltage of said Hall effect element detected when said throttle valve is full opened immediately before said ignition key switch is turned off from its on state during the operation of said engine after the step (a); and
(c) computing the temperature coefficient on the basis of the values of the temperature of said Hall effect element and the values of the angle of said throttle valve shaft detected and computed in th (a) and (b), and using said computed temperature coefficient as a temperature coefficient at the time of an (i+1)th engine starting operation.

9. A method of temperature compensation in a throttle angle sensor as claimed in claim 2, comprising the steps of:
dividing the operating temperature range of said engine into a plurality of sub-ranges and previously computing and storing a temperature coefficient in each of said sub-ranges;
reading out one of said stored temperature coefficients corresponding to a temperature detected during the operation of said engine; and
using said read-out temperature coefficient for temperature compensation in the corresponding one of said sub-ranges.

10. A method according to claim 9, wherein said temperature coefficient represents that computed when said throttle valve is in its full closed or full open position.

11. A method according to claim 9, wherein said temperature coefficient represents the mean value of those computed when said throttle valve is in its full open position and in its full closed position.

12. A method according to claim 9, wherein the temperature coefficients computed for said predetermined plural sub-ranges are approximated by a function which is stored, and the temperature coefficient computed according to said stored function is read out depending on the detected temperature so as to be used for the temperature compensation.

13. A method of temperature compensation in a throttle angle sensor as claimed in claim 2, comprising the steps of:
previously computing temperature coefficient at the full closed position and a predetermined small shaft angle position respectively of said throttle valve and storing the mean value thereof; and
using said stored mean value of the temperature coefficients for temperature compensation in the range between said full-closed position and said predetermined small shaft angle position of said throttle valve.

14. A method according to claim 13, wherein the temperature coefficients in said small shaft angle range are previously stored as a function of the angle of said throttle valve shaft, and the temperature coefficient computed according to said function is used for the temperature compensation.

15. A method of temperature compensation in a throttle angle sensor as claimed in claim 2, comprising the steps of:
dividing a small shaft angle range between the full closed position and a predetermined small shaft angle position of said throttle valve into a plurality of sub-ranges;
previously computing and storing a temperature coefficient in each of said sub-ranges;
reading out the previously stored temperature coefficient corresponding to a shaft angle of said the valve when the angle of said throttle valve shaft lies in said small angle range; and
using the read-out temperature coefficient for achieving the temperature compensation in each of said sub-ranges.

16. An angle sensor for a throttle valve of an internal combustion engine, comprising:
a permanent magnet for generating a magnetic field, said permanent magnet being disposed at one end of the shaft of the throttle valve so as to move in a plane substantially transverse to the axis of said throttle valve shaft with the rotation of said throttle valve shaft;
a throttle body accommodating said throttle valve;
a cavity formed as an integral part of said throttle body to freely rotatably accommodate said permanent magnet and communicating with a bore through which said throttle valve shaft extends;
a magneto-sensitive element disposed in said cavity with its detecting surface in a plane substantially transverse to the axis of said throttle valve shaft and in a relation substantially facing the maagnetic-flux appearing surface of said permanent magnet and being spaced apart from said magnetic-flux appearing surface of said permanent magnet by a varying gap so as to detect a change in the magnetic flux density as a result of the change in said gap with rotation of said permanent magnet; and
an electrical circuit receiving and amplifying the output of said magneto-sensitive element so as to convert the detected change in said magnetic flux density into a corresponding change in an electrical signal.

17. An angle sensor according to claim 16, wherein said magneto-sensitive element is a Hall effect element whose output voltage level changes in response to a change in the intensity of said magnetic field.

18. An angle sensor according to claim 17, wherein said permanent magnet and said Hall effect element have temperature coefficients of respectively opposite polarities.

19. An angle sensor according to claim 17, wherein said magnetic-flux appearing surface of said permanent magnet is contoured so that the detecting characteristic of said Hall effect element is determined by the contour of said surface.

20. An angle sensor according to claim 16, wherein said permanent magnet has a tapering cross-section so that said magnetic-flux appearing surface is disposed at an angle to the detecting surface of said magneto-sensitive element.

* * * * *